United States Patent [19]

McEuen

[11] Patent Number: 4,811,220
[45] Date of Patent: Mar. 7, 1989

[54] METHOD FOR VISUAL DISPLAY AND ANALYSIS OF SUBSURFACE ROCK PROPERTIES AND STRUCTURE UTILIZING COLORED MAGNETOTELLURIC TRANSFER FUNCTIONS

[76] Inventor: Robert B. McEuen, 5202 College Gardens Ct., San Diego, Calif. 92120

[21] Appl. No.: 912,077

[22] Filed: Sep. 25, 1986

Related U.S. Application Data

[63] Continuation-in-part of Ser. No. 615,753, May 31, 1984, abandoned.

[51] Int. Cl.$^4$ .............................................. G01V 1/34
[52] U.S. Cl. ....................................... 364/420; 367/70
[58] Field of Search .................... 364/420; 367/70, 68, 367/71

[56] References Cited

U.S. PATENT DOCUMENTS

| | | | |
|---|---|---|---|
| 4,100,482 | 7/1980 | Yamashita | 324/6 |
| 4,228,529 | 10/1980 | Hsu et al. | 367/70 |
| 4,467,461 | 8/1984 | Rice | 367/70 |

*Primary Examiner*—Jerry Smith
*Assistant Examiner*—Kim Thanh Tui

[57] ABSTRACT

A three-dimensional display and interpretation technique, in which magnetotelluric survey and modeling data are transformed and compared in order to yield a remotely determined picture of subsurface rock properties and structure, is disclosed. Normalized transfer functions for the magnetotelluric fields are displayed, as normalized impedance polar diagrams, properly oriented at appropriate probing depths using a logarithmic vertical coordinate. The form of these and other normalized polar diagrams provide geologic information on local-structure dimensionality. Colors are derived and assigned to particular azimuthal segments of the normalized impedance polar diagrams in order to identify rock properties in particular directions at depth. This unique combination results in structural and rock property information being simultaneously displayed in a single trace. Null readings from a differential display are used to indicate correspondence between field survey impedance measurements and measurements derived from numerical analysis of a model. Time is used to model diffusion of magnetotelluric energy into the ground as well as to identify differing wave components. Colored geologic sections, fence diagrams, etc., can be generated in real-time by this display and analysis technique from standard magnetotelluric data sets.

22 Claims, 11 Drawing Sheets

DISPLAY GENERATION

MODEL DISPLAY

MODEL RESPONSE

FIELD DATA

VECTOR DIFFERENCE DIAGRAMS

DISPLAY GENERATION

METHOD FOR VISUAL DISPLAY AND ANALYSIS OF SUBSURFACE ROCK PROPERTIES AND STRUCTURE UTILIZING COLORED MAGNETOTELLURIC TRANSFER FUNCTIONS

This application is a continuation-in-part of that filed May 31, 1984 (application Ser. No. 615,753), now abandoned.

BACKGROUND OF THE INVENTION

1. Field of Invention

This invention relates to the use of interlocking displays in which a difficult to summarize multitude of parameters, useful for geologic interpretation of magnetotelluric data, are displayed in a way that immediately determines subsurface rock structure and properties.

2. Description of Prior Art

Prior art displays transfer functions for the magnetotelluric fields as polar diagrams, both normalized and un-normalized, and plots results obtained for a specific period with no attempt being made to display these data in relation to the vertical position within the earth or model most likely to be associated with the measured or theoretical polar diagrams. This prior practice is well described in an article by Reddy, Rankin and Phillips, in Geoph J. Roy. Ast. Soc., v. 51 (1977), pp 313–325.

SUMMARY OF INVENTION

The present invention is a technique that allows the viewing of magnetotelluric data for a single station or synoptic viewing of entire multi-station data arrays such as those typically collected in so-called "speculative" surveys by major magnetotelluric contractors. In the application most often used, the data provided by the survey party are transformed into normalized impedance polar diagrams which are then displayed in an apparent three-dimensional space in which the horizontal dimensions are scaled to those used for the field survey and the vertical dimension is scaled to a parameter that is closely related to the log of the "Bostick" probing depth (See equation 4).

It has become practice to assign to each five degree segment of each normalized anti-diagonal impedance polar diagram a specific color that can be used to identify the Bostick "true" rock resistivity in that particular azimuth (See equation 8). The multi-station array of colored normalized polar diagrams displayed in this way may contain several thousand individual polar diagrams. This entire array is studied in detail by zooming in on regions of interest and by selecting viewing azimuths and distances that allow the detail of geologic significance to come forward.

The utility of this display technique rests in the fact that all of the impedance data for a survey are converted to geologic structure parameters (normalized polar diagrams) and rock property parameters (resistivity values) and are displayed at appropriate depths simultaneously and in real-time with respect to data collection, if desired. This allows one to immediately visualize trends in subsurface resistivities, rotation directions, and anisotropy, and to rapidly identify data of questionable quality. Vertical expansion of the size of individual normalized polar diagrams, until they just merge with overlying diagrams, is used to produce sections and fence diagrams in which subtle changes in resistivity appear as subtle changes of hue.

Dynamic displays and differential displays are generated in accordance with this invention. In the dynamic displays the normalized impedance polar diagrams are illuminated sequentially to simulate the diffusion of the electromagnetic magnetotelluric wave into the conductive medium. This sequencing being from shortest wave period to longest wave period. The differential display summarizes the differences between the survey data and data derived from a test model in order to determine a model that correctly explains the field survey measurements.

It is therefore an object of this invention to provide a means for a much more complete comparison to be made between the theoretical response of a model and the response determined from in-the-field measurement than is possible using present magnetotelluric art.

A still further object of this invention is to preserve in a single trace, important structural information contained in the polar diagrams and rock property information through the use of color.

These and further objects of this invention will become apparent or be explained as the description thereof herein proceeds and reference is made to the accompanying drawings in which.

DETAILED DESCRIPTION OF THE INVENTION

Figure 1:
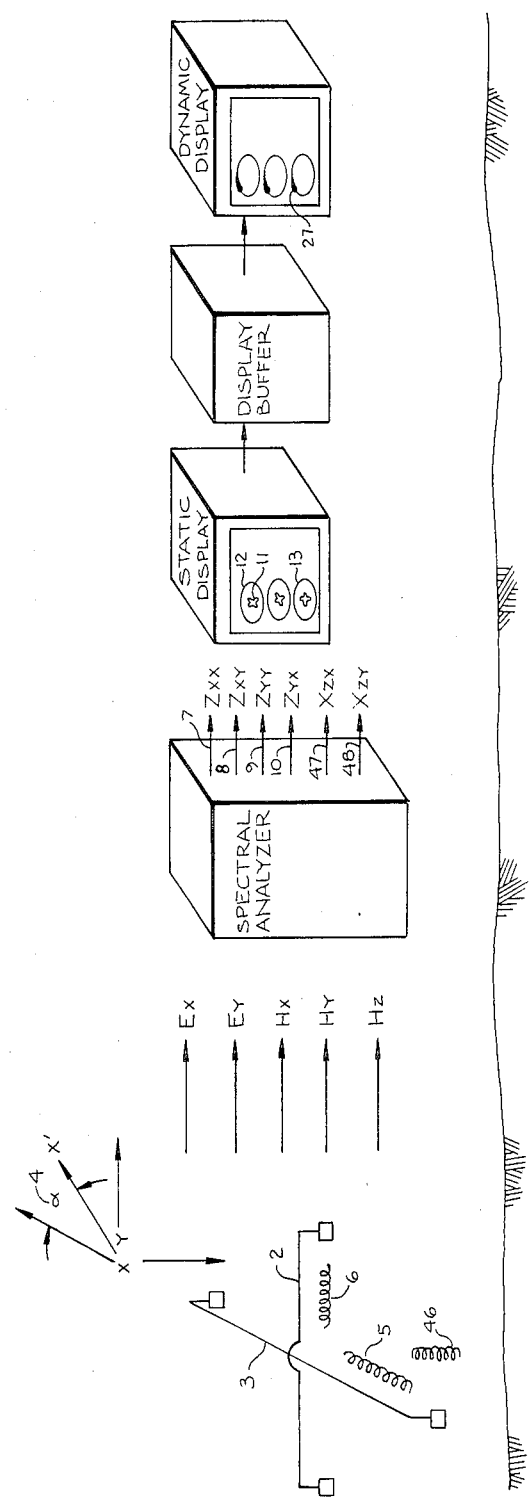
FIG. 1 shows the method being used in conjunction with a magnetotelluric field system to attain real-time subsurface analysis and to determine the quality of the measured data.

The theory of operation of the invention will be made clear by making reference to all of the figures but, in particular FIGS. 1, 2, and 3, which describe a preferred form of the invention. It is well known, as is depicted in FIG. 1, that measuring mutually perpendicular components of the naturally occurring electromagnetic field at the surface of the earth, 1 in FIG. 1, over a range of wave periods, T, allows determination of the functions Zxx, Zxy, Zyx, and Zyy for each period measured. This prior practice is well described in an article by Vozoff, in Geophysics, v. 37 (1972) p. 103. The relation of these functions or impedance elements to the electric fields Ex and Ey measured with the dipoles 2 and 3 of FIG. 1, and to the magnetic fields Hx and Hy measured by coils 5 and 6 is given, for any period T by the equation:

$$\begin{pmatrix} Ex \\ Ey \end{pmatrix} = \begin{pmatrix} Zxx & Zxy \\ Zyx & Zyy \end{pmatrix} \begin{pmatrix} Hx \\ Hy \end{pmatrix} \quad (1)$$

This equation describes completely the transfer function that exists between the measured horizontal electric and magnetic fields for the case in which no vertical magnetic field exists. This transfer function for the above described case can be equally well defined and described through the use of two polar diagrams, the diagonal impedance polar diagram and the anti-diagonal impedance polar diagram. It is the purpose of this invention to display this and other transfer functions through the use of polar diagrams. In order to describe a preferred embodiment of the invention, the diagonal impedance $Zx'x'(\alpha)$ in an arbitrary direction $x'$ (defined by the angle $\alpha$ in FIG. 1) and the anti-diagonal impedance $Zx'y'(\alpha)$ in the same direction are defined:

$$Zx'x'(\alpha) = Zxx\text{Cos}^2(\alpha) + (-Zxy - Zyx)\text{Sin}(\alpha)\text{Cos}(\alpha) + Zyy\text{Sin}^2(\alpha) \quad (2)$$

$$Zx'y'(\alpha) = Zxy\text{Cos}^2(\alpha) + (Zyy - Zxx)\text{Sin}(\alpha)\text{Cos}(\alpha) - Zyx\text{Sin}^2(\alpha) \quad (3)$$

For a given period, the four complex constants Zxx, Zxy, Zyx, and Zyy (i.e., 7, 8, 9, and 10 of FIG. 1) are derived in real-time by state-of-the-art magnetotelluric prospecting systems and form, along with knowledge of the period T of the wave component being analyzed and the measurement station data measurement coordinates and location, the input data suite to the invention disclosed here. This input data suite is available in a standard digital form from field contractors that collect magnetotelluric data.

It is the purpose of a preferred embodiment of the invention to provide a unique means to visualize the subsurface geologic structural information contained in equations (2) and (3), or their normalized equivalents $$\frac{Zx'x'}{Zx'y'(\alpha)\text{max}} \quad \frac{Zxy'(\alpha)}{Zx'y'(\alpha)\text{max}}$$

(where $Zx'y'(\alpha)_{max}$ is the maximum value of $Zx'y'(\alpha)$) while at the same time providing through the use of color, simple geologically significant rock parameters such as given by equation (6) or (8) and to display the results as a function of time where the time sequencing is determined so as to simulate the diffusion of the electromagnetic magnetotelluric wave into the conductive medium.

In 1977, F. X. Bostick defined a magnetotelluric probing depth, d, expressed by the equation $$d = \sqrt{\frac{\rho a T}{\mu 2 \pi}} = \frac{1}{\sqrt{2}} \delta \quad (4)$$

where $\rho a$ is the apparent resistivity (Workshop on Electrical Methods in Geothermal Exploration: USGS Contract #14-08-001-G-359). For regions in which the resistivity structure is two or three-dimensional, a preferred embodiment of the invention disclosed here, defines a somewhat similar probing depth, D, as $$D = .1T(|Zx'y'|_{max} + |Zx'y'|_{min}) \quad (5)$$

where T is the period of the wave being analyzed, $\mu$ is the magnetic permeability and $\delta$ is the electromagnetic skin depth. By considering both impedance polarizations, namely $Zx'y'$ max and $Zx'y'$ min, a display is created in which vertical offsets such as geologic faults are readily indicated with a minimum of display distortion. When the subsurface is uniform, D becomes equal to d, the Bostick probing depth. Other probing depth relations, such as those that consider only the impedance in geologic strike direction can also be used.

Figure 2:
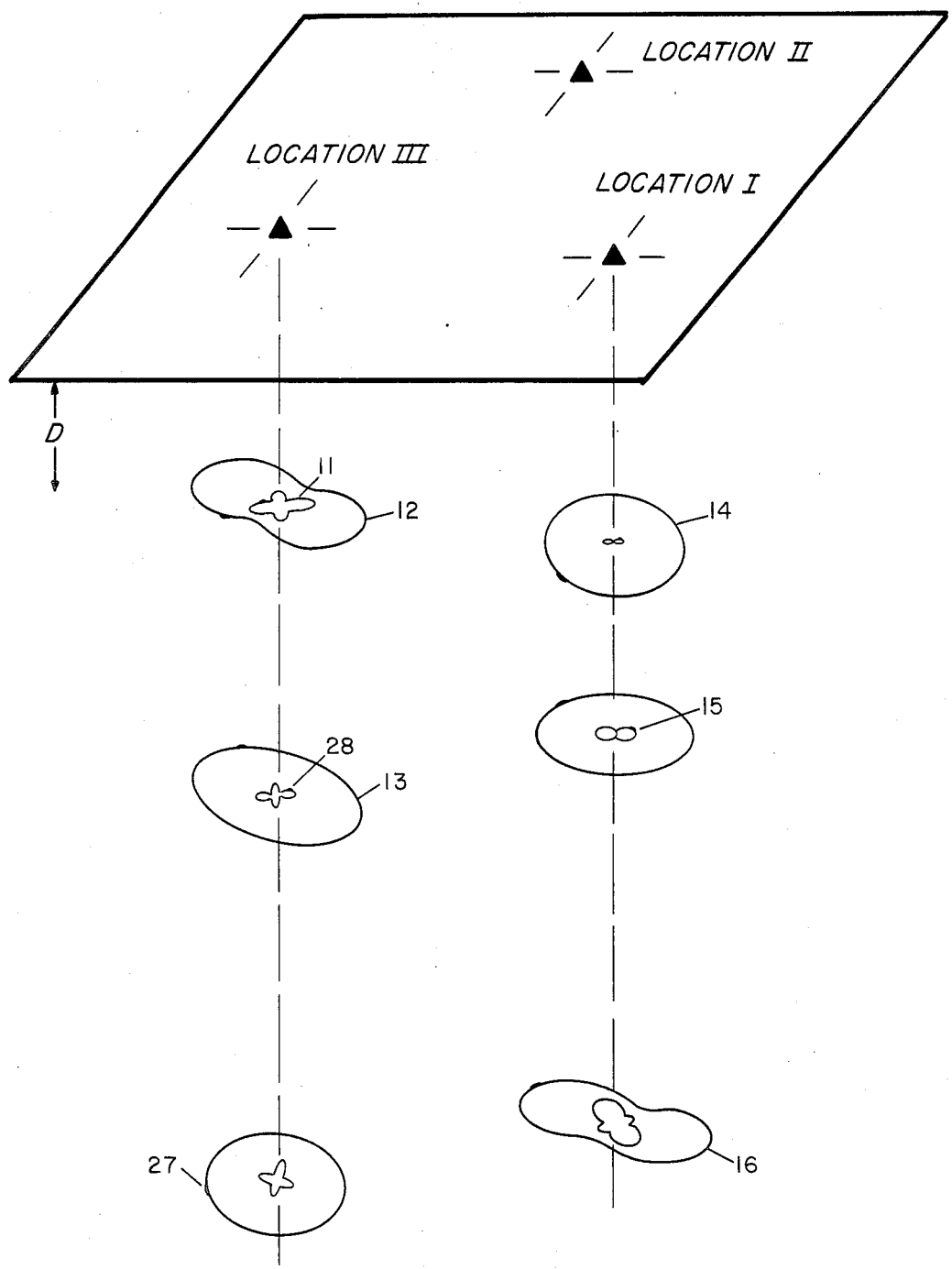
FIG. 2 shows in greater detail the normalized impedance polar diagrams presented at probing depths for two magnetotelluric measurement locations.

Curves 11 and 12 of FIGS. 1 and 2 form the locus of all normalized solutions for equations (2) and (3), respectively, at all values of the rotation angle $\alpha$ (normalization is with respect to the maximum amplitude determined on rotation). Prior art simply prints such patterns on a flat surface making their significance in terms of geologic structures difficult to determine. The present invention not only positions them properly in three dimensions, but maintains information lost through normalization, through the use of color, or uses color to record on the same trace non-structural information calculated for the corresponding probing depth and azimuths.

The three dimensional display, for a preferred embodiment, is constructed by projecting the polar diagrams onto a two-dimensional surface such as a cathode-ray tube computer screen. The location in space of each polar diagram is referenced to the display origin, where the display origin is the point for which both horizontal coordinates x and y are equal to zero and the vertical coordinate, which corresponds to the probing depth coordinate, is equal to ten meters. The horizontal location of the center of each polar diagram is given by the location of the station at which the electric and magnetic fields were measured. The vertical coordinate of the center of each polar diagram is the base ten logarithm of the probing depth.

The orientation at which the data are viewed is specified in terms of the spherical coordinates of the viewer with respect to the display origin. These coordinates are in distance (in arbitrary units) of the viewer from the origin, the horizontal angle from the x-axis of the data set, and the vertical angle from the z-axis of the data set. The projection of the true spatial coordinates of the loci of points comprising the polar diagrams onto the appropriate cathode ray tube locations is accomplished using standard transformation techniques as described in Mathematical Elements for Computer Graphics, Rogers and Adams, McGraw-Hill, 1976.

The display, as depicted in FIG. 2, also includes spots, 27, 28, of increased intensity that trace out in space and time the normalized solution of equations (2) and (3). These tadpole-like spots are generated by recalling from a display buffer, as a function the rotation angle, $\alpha$, (4 in FIG. 1), and time, normalized impedance polar diagram amplitude values for small and sequential increments of rotation angle and displaying, at increased intensity, the short line segments or spots these values create. The recall from the display buffer is carried out according to a timing sequence that causes these spots to complete their cycle around their respective normalized impedance polar diagram in a time period that is equal or proportional to the period of the magnetotelluric wave component being analyzed. Not only does their presence on the display allow immediate identification of normalized impedance polar diagrams for wave components of the same period at adjoining stations, but they can be useful in further indicating the amount of rotation associated with the normalized impedance polar diagram. That is, they can, for example, be phase adjusted so that for a given period they reach the azimuth corresponding to the maximum value of normalized impedance polar diagram radius at the same time. This allows subtle changes in geologic strike direction occurring between stations to be more readily recognized. These spots are of equal utility when displaying un-normalized polar diagrams such as those shown in FIG. 5.

Figure 3:
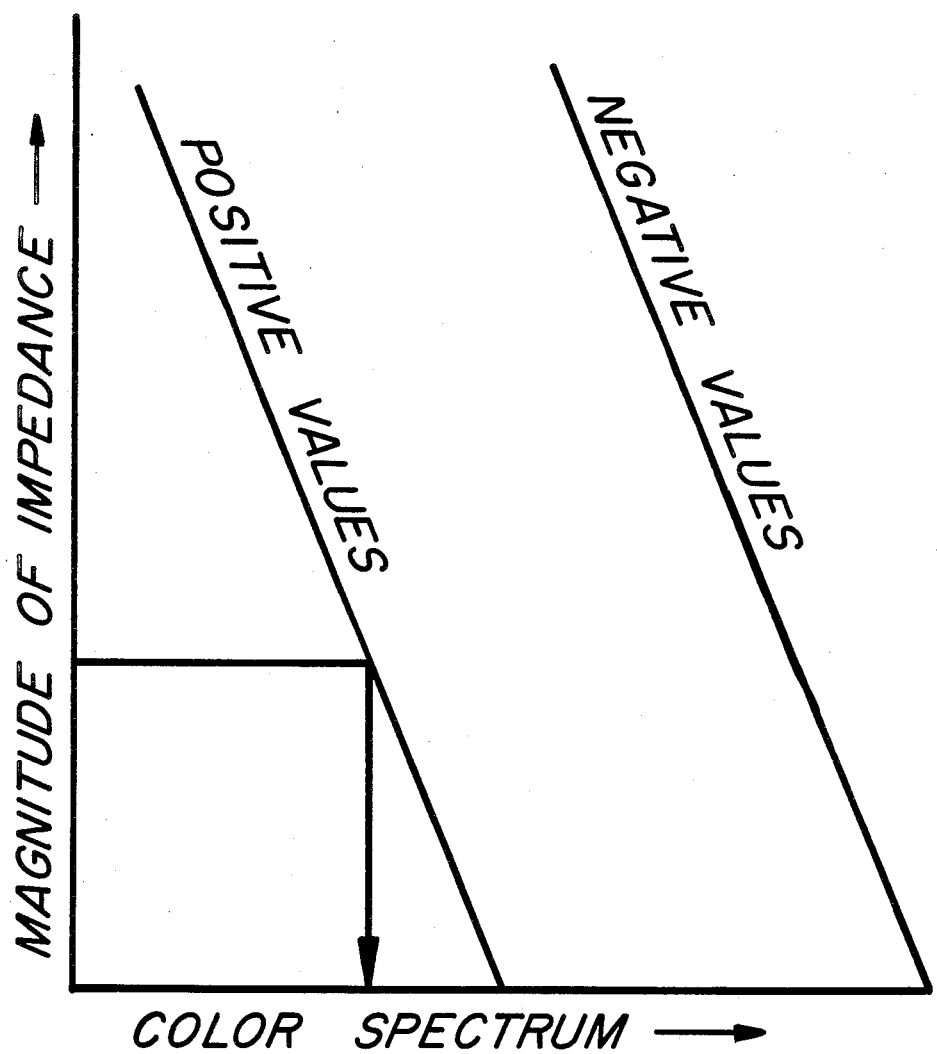
FIG. 3 shows how colors are selected for use in the depiction of the magnetotelluric-measurement-derived resistivities, and to depict the correspondence between field survey results and results obtained by numerical analysis of a model.
Figure 4A:
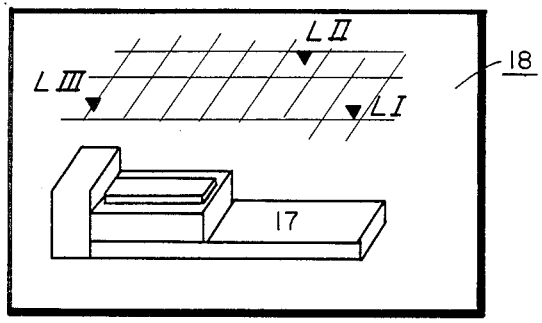
FIGS. 4a, 4b, 4c, 4d illustrate how the method for visual display is used to produce accurate models of the subsurface.
Figure 4B:
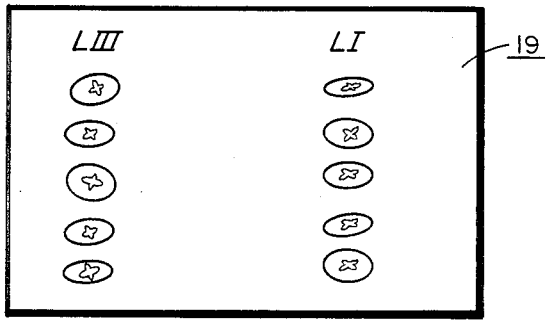
Figure 4C:
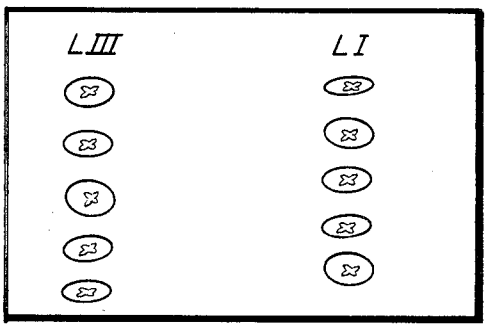
Figure 4D:
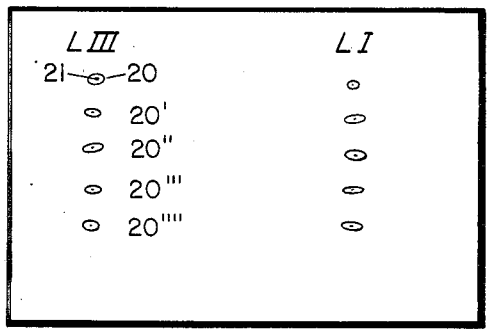

The color look-up functions described by the FIG. 3 accommodate the assignment of color to three distinct variables; namely, positive and negative impedance difference values (used for providing colors for displays of this difference), and resistivity values. For each of these three variables, there is only one color available for a given magnitude. As a practical matter, however, the color spectrum is broken into blocks. The color look-up function used to produce the displays shown in FIG. 10, had 15 such blocks making only 15 discrete colors available.

For the preferred embodiment disclosed here, the form of curves of the type indicated by 12 of FIGS. 1 and 2 is established by equation (3) while the color is established using a relationship such as $$\rho_a x'y'(\alpha) = .2T |Zx'y'(\alpha)|^2. \qquad (6)$$

The geologic significance of such a color assignment becomes immediately clear to one skilled in the magnetotelluric prospecting art. With such an assignment, all curves of type 12 will have the same color for regions where the subsurface geology does not vary. In addition, the color relates directly to important rock parameters such as available pore space and type of saturating fluid. That is, the color provides the apparent resistivity, $\rho_a$, of the volume of rock being investigated by the wave component of period T.

An alternative and more useful color assignment is based on the Bostick "true" resistivity which is given by $$\rho_B x'y'(\alpha) = \rho_a x'y'(\alpha) \frac{1 - \frac{d \log \rho_a x'y'(\alpha)}{d \log \omega}}{1 + \frac{d \log \rho_a x'y'(\alpha)}{d \log \omega}} \qquad (7)$$

where $\rho_a x'y'(\alpha)$ is given by equation (6) and $$\omega = \frac{2\pi}{T}$$

where T is the period of the wave component being considered. Note that equation (7) can more simply be expressed in terms of the phase angle, $\phi_{x'y'}(\alpha)$, that expresses the amount the magnetic field, measured in the y' direction lags the electric field as measured in the mutually orthogonal x' direction. Equation (7) written in this form is $$\rho_B x'y'(\alpha) = \rho_a x'y'(\alpha) \frac{\pi/2 - \phi x'y'(\alpha)}{\phi x'y'(\alpha)} \qquad (8)$$

Written in this way it can be seen, by one skilled in the art, that whereas equation (6) uses just the amplitude of the impedance and hence the amplitude of the measured fields to select an appropriate color, equation (8) uses both amplitude and phase to base its selection on. Simply put, more of the data as measured in the field is used to determine colors according to equation (8) than according to equation (6). As a practical matter, when using equation (8), the uniformity of the colors and the smooothness of their change with change in the rotation angle, provide the interpreter with valuable information about the internal consistency between the field measured amplitude and phase data sets. For example, properly behaved phase data will cause the colors to be symetrically distributed with respect to the coordinates of the normalized impedance polar diagram.

The color assignments given by equation (8) correlate more closely with localized values of rock resistivity than the assignment provided by equation (6). This close correlation between display color and rock property can be used to trace particular rock formations or fluid properties in the subsurface. This is accomplished by using color to illuminate only the range of resistivity characteristic of the formation or fluid to be traced, with the remainder of the display being displayed in a default color such as white, or simply being turned off. The converse has also proven effective where the range of resistivity to be traced is assigned the default color, usually white, and the remainder of the display is colored in the normal way in accordance with the derived resistivities.

When the subsurface geology is expected to be layered, the effect of this layering can be simulated by filling in the faces of the anti-diagonal impedance polar diagrams with pie shaped wedges having the same color as the portion of the normalized impedance polar diagram making up their curved outer perimeter.

The invention can also be used to create colored sections or fence diagrams from the input data suite in which the distribution of color corresponds closely to the distribution of subsurface rock properties such as temperature/porosity/salinity etc. Rather than have the normalized impedance polar diagram trace be the minimum trace width, it is expanded vertically so that all horizontal gaps between said traces in the display are filled. The resulting color defines the temperature/porosity/salinity structure. Such displays are usually generated by calling up all the Zx'y' normalized anti-diagonal impedance polar diagrams and viewing the resulting ensemble in the TE (along strike) direction, at an angle from the vertical of 92 degrees. The static monitor display of reformatted field data shown in FIG. 10 was generated in this way.

The unique processing method of data display described here finds wide use during the process of magnetotelluric data collection. This facet of application is depicted in FIGS. 1 and 2. Curves 14, 15, and 16 of FIG. 2 represent data acquired at a previously occupied station, Station 1. By comparing patterns for various stations, the geologic strike direction and similar structural information can be determined in the field, allowing the field survey program to be laid out to take advantage of these facts. Because of the complicated nature of the patterns from which the geologic information is deduced, and the need to view a multiplicity of such patterns in proper perspective, such important logistical decisions were not rendered during field survey programs prior to the advent of the method disclosed here.

The input data required to operate this invention cannot only be derived from field measurement, but also from theoretical solutions for earth models. The ultimate exploration objective is to obtain an earth model whose theoretical values of $Z_{x'X'mdl}(\alpha)$ and $Z_{x'y'mdl}(\alpha)$ agree with those determined from the field measurement. FIG. 4 depicts the method disclosed herein, being used to establish the earth model that corresponds to measured field data. Theoretical values for models such as 17 of FIG. 4 can be derived for one, two, and three dimensional earth models. For example, theoretical model responses in the form of normalized impedance polar diagrams for simple one dimensional "layer cake" earth models can be obtained using the algorithm published by Oldenburg, in Geophysics, v.44 (1979), pp 1218-1244; normalized impedance polar diagram responses for more complex two dimensional earth models can be obtained by using the finite difference approach described in detail by Jupp and Vozoff, in Geophys. J. Roy. Ast. Soc., v. 50 (1977), pp 333-352; and finally the normalized impedance polar diagram response for three-dimensional earth models can be determined by extending the thin-sheet approach suggested by Madden and Park, in 1982, in USGS Final Rep. 14-08-001-G-643.

In order to aid the description of the operation of the invention, a three-dimensional model 17 is shown in model display 18. This model is displayed in the same perspective as the normalized impedance polar diagrams derived from the model's theoretical magnetotelluric response. These responses are displayed in model response display 19. The earth model 17 is adjusted until the magnitude of Vector Difference Diagrams 20 reach predetermined minimum values. For the embodiment being described, the Vector Difference Diagrams 20 and 21 are un-normalized values of $$Z_{x'x'}(\alpha)_{mdl} - Z_{x'x'}(\alpha)_{fld} \tag{9}$$

and $$Z_{x'y'}(\alpha)_{mdl} - Z_{x'y'}(\alpha)_{fld} \tag{10}$$

respectively.

Because the vector differences expressed by equation (7) and (8) can change sign, radically differing color call-up codes (such as that shown in FIG. 3) are used for positive and negative vector difference magnitudes.

Figure 5:
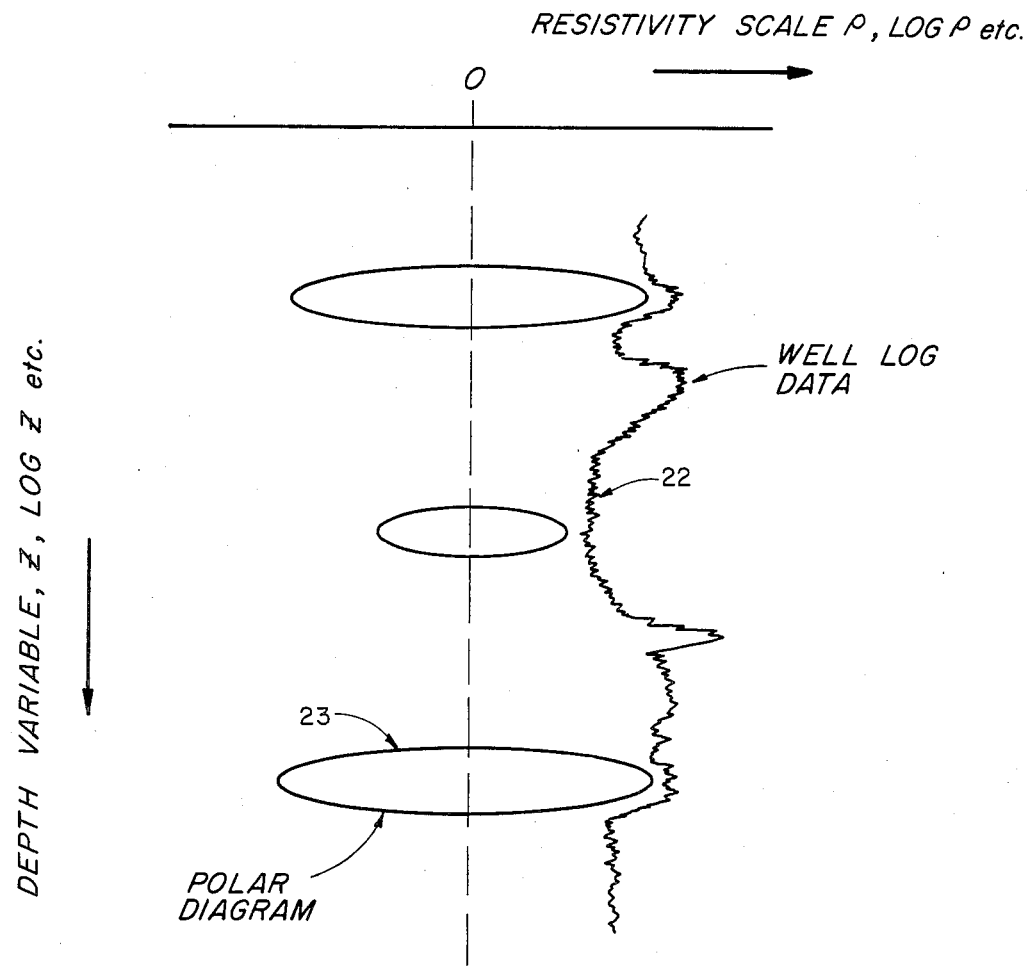
FIG. 5 shows a calibration run in which the polar diagram response is compared against available well log information.

Occasionally, magnetotelluric data are collected at locations where the true resistivity, $\rho_T$, derived from well-log information is available. Under ideal conditions, the value of $\rho_B x'y'(\alpha)$ given by equation (7) should correspond to $\rho_T$ when plotted as a function of the probing depth, D, given by equation (5). FIG. 5 shows such a comparison between $\rho_T$ indicated by 22 and $P_B x'y'(\alpha)$ indicated by 23. If the ideal conditions alluded to above pertain in which the electrical properties of the earth vary only with depth, the curves representing $\rho_B x'y'(\alpha)$ will be circles and will be tangent to the well-log $\rho_T$ response. If the color used to portray the function $\rho_B X'Y'(\alpha)$ is also selected in a way such that it relates to the magnitude of $\rho_B x'y'(\alpha)$, the slight departures from circular behavior will be reflected in change in hue allowing such departures to be detected even when the function representing is projected in three-dimensional space.

Because of the low frequencies used in magnetotelluric prospecting and considering the relatively high conductivity of the earth material investigated using this technique, the transport of the electromagnetic disturbance into the subsurface is most correctly described as a pure diffusion process.

This statement is described numerically by the equations $$\nabla^2 H \approx \frac{\mu}{\rho} \frac{\partial H}{\partial t} \approx j \frac{\omega \mu}{\rho} H \tag{11}$$

$$\nabla^2 E \approx \frac{\mu}{\rho} \frac{\partial E}{\partial t} \approx j \frac{\omega \mu}{\rho} E \tag{12}$$

$$\nabla^2 C \approx \frac{1}{\Delta} \frac{\partial C}{\partial t} \approx j \frac{\omega}{\Delta} C \tag{13}$$

Equations (11) and (12) describe the process governing the electromagnetic field and equation (13) describes the process of linear diffusion where C is the concentration and $\Delta$ is the diffusion coefficient. Inspection shows that for a medium such as the earth in which $\mu$, the magnetic permeability can be considered constant, the resistivity $\rho$ plays a role identical to the diffusion coefficient $\Delta$ in the chemical analog.

It is a purpose of the invention disclosed here to present magnetotelluric data in a way that stresses the diffusive nature of the basic process, thus bringing a new dimension to the interpretative procedure. Although many ways to exploit this analogy can be envisioned by one skilled in the magnetotelluric art, for the purpose of demonstrating the novel approach disclosed here, the simple relation defined by equation (4) will be used.

$$d = \sqrt{\frac{\rho x'y' T}{2\pi\mu}} \tag{4}$$

The quantity $\rho x'y'$ can be visualized as an apparent diffusion coefficient. It can be shown that the maximum electric field and current below a line source diffuse downward with a velocity.

$$v = \frac{4}{\ } \sqrt{\frac{\rho x'y'}{\pi \mu t}} \tag{14}$$

This equation is taken directly from an article by Oristaglio in Geophysics, v. 47, 1982, pp 1585-1592, entitled, "Diffusion of Electromagnetic Fields into the Earth from a Line Source of Current." Since the downgoing diffusion front soon approximates a plane wave, its progress can be used to simulate the diffusion process involved in magnetotelluric prospecting.

By integrating equation (14) with respect to time to get depth, and equating to equation (4), we can determine the time, t, at which the diffusing current reaches a given probing depth. The result is given in equation (15).

$$t = \left(\frac{2}{8\sqrt{2}}\right)^2 T = .633\, T \qquad (15)$$

That is, for a probing depth corresponding to the wave component of period 100 seconds, it takes 63.3 seconds for the maximum to arrive irrespective of the value of $\rho_{xy}$. Table I shows the illumination times from a typical example.

TABLE I

| Period | Time | Log$_{10}$ Period | Log$_{10}$ Time |
|---|---|---|---|
| .0104 | .0066 | −1.9830 | −2.1817 |
| .0556 | .0352 | −1.2549 | −1.4537 |
| .0333 | .2107 | −.4776 | −.6763 |
| 1.778 | 1.1251 | +.2499 | .0512 |
| 10.666 | 6.7496 | 1.0280 | .8293 |
| 56.889 | 36.0001 | 1.7550 | 1.5563 |

As a practical matter, it is desirable to display the polar diagram information within a coordinate system having linear horizontal coordinates and a logarithmic vertical axis. This choice stems from the large range of depth explored by the magnetotelluric method and the interpreter's desire to display in greater detail the properties of the near surface.

In line with the compression of the vertical display, it is often desirable to illuminate the polar diagrams in the diffusion simulation by means of a logarthmically transformed time base. This tends to bring out fine structure having to do with diffusion in the near surface at the expense of detail pertaining to very deep diffusion. This is accomplished by letting the illumination time, $t_i$, take on values equal to the nlog$_{10}$ of the "real-time" diffusion times defined by equation (15)

Further compression can be accomplished by letting $$t_i = n \log t_{rt} \qquad (16)$$

in which n is a positive number, for instance when n equal $\frac{1}{2}$ $t_i$ becomes $$t_i = \log\sqrt{t} \qquad (17)$$

Figure 6A:
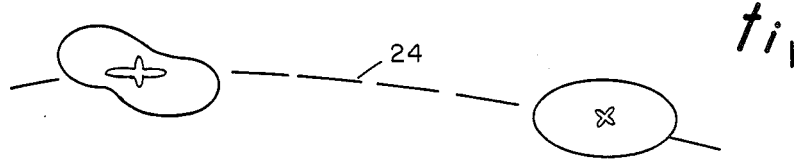
FIGS. 6a, 6b, 6c show a sequence of normalized impedance polar diagrams which, when switched at a regular rate from period to period, depict the diffusion of the electromagnetic field into the conductive medium.
Figure 6B:
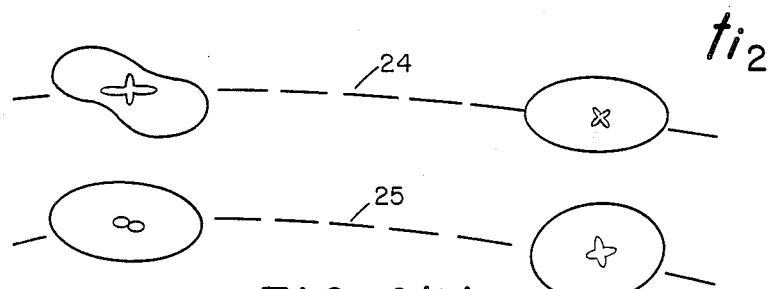
Figure 6C:
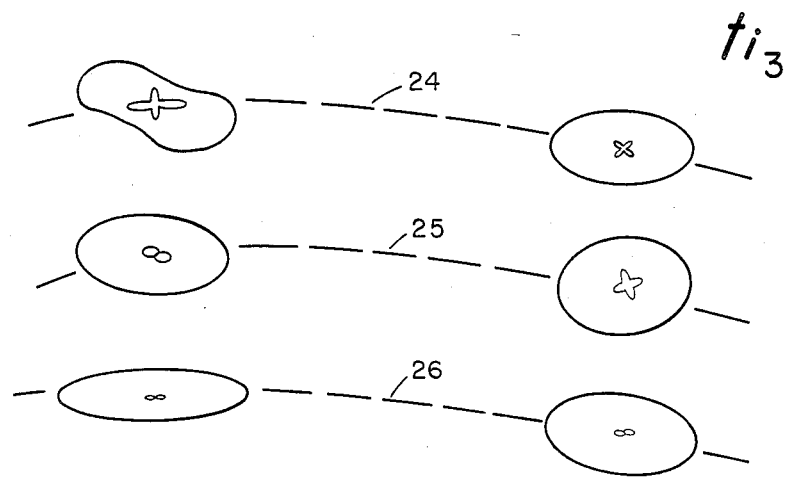
Figure 7A:
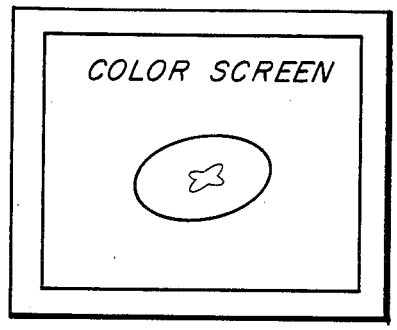
FIGS. 7a, 7b, 7c depict how hard copies are generated of the three dimensional display.
Figure 7B:
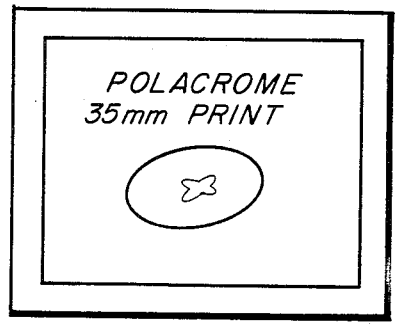
Figure 7C:
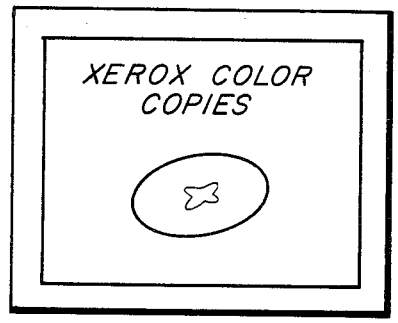

In FIG. 6, numbers 24, 25, and 26, represent the forward progress of the illuminating diffusion front. FIG. 7 depicts how hard copies of the three dimensional perspective images are obtained using the technique disclosed herein.

Modern computer graphics allow the rotation of axes to any azimuth so the three-dimensional projection of the polar diagrams as shown in FIGS. 1, 2, 4, and 5, and 6, can be viewed from any vantage point. High resolution color 35 mm transparencies can be obtained directly from the color screen through the use of the Polacrome process. This process produces "instant" color transparencies using a dry process. The availability of this technology coupled with the ability to make page size color prints from 35 mm transparencies using color xerography effectively means that a permanent color copy can be quickly obtained of the polar diagram display. Typically, a series of photographs are shot representing various vantage points and at various times in the diffusion process.

Enhanced three-dimensional perception can be obtained by stereoscopically viewing paired images having slightly differing vantage points. This can be achieved from hard copies using a conventional stereoscope or by viewing two monitors stereoscopically in which case, each monitor displays the image obtained from a different vantage point.

The invention disclosed to this point deals with a unique method for analysis of horizontal electric and magnetic fields. Although the main application rests in the analysis of such horizontal fields, its extension to include analysis of the vertical magnetic field, such as would be measured by coil 46 in FIG. 1, is anticipated. An equation, analogous equation (1), can be written that describes for each wave period the transfer function (Xzx Xzy) between the vertical magnetic field Hz, and the horizontal magnetic field components Hx and Hy.

$$Hz = (Xzx\ Xzy)\begin{pmatrix} Hx \\ Hy \end{pmatrix} \qquad (18)$$

The polar diagram representation of this transfer function is given by $$X_{z'x'}(\alpha) = X_{zx}\cos(\alpha) + x_{zy}\sin\alpha \qquad (19)$$

The quantities Xzx and Xzy, 47 and 48 FIG. 1, are complex constants referred to as the Tipper Elements in the x and y direction, respectively.

A useful display that uses the vertical magnetic field involves the superposition of the impedance polar diagram given by equations (2) and (3) and the tipper polar diagram given by equation (19), for the same wave period and station location.

Figure 8:
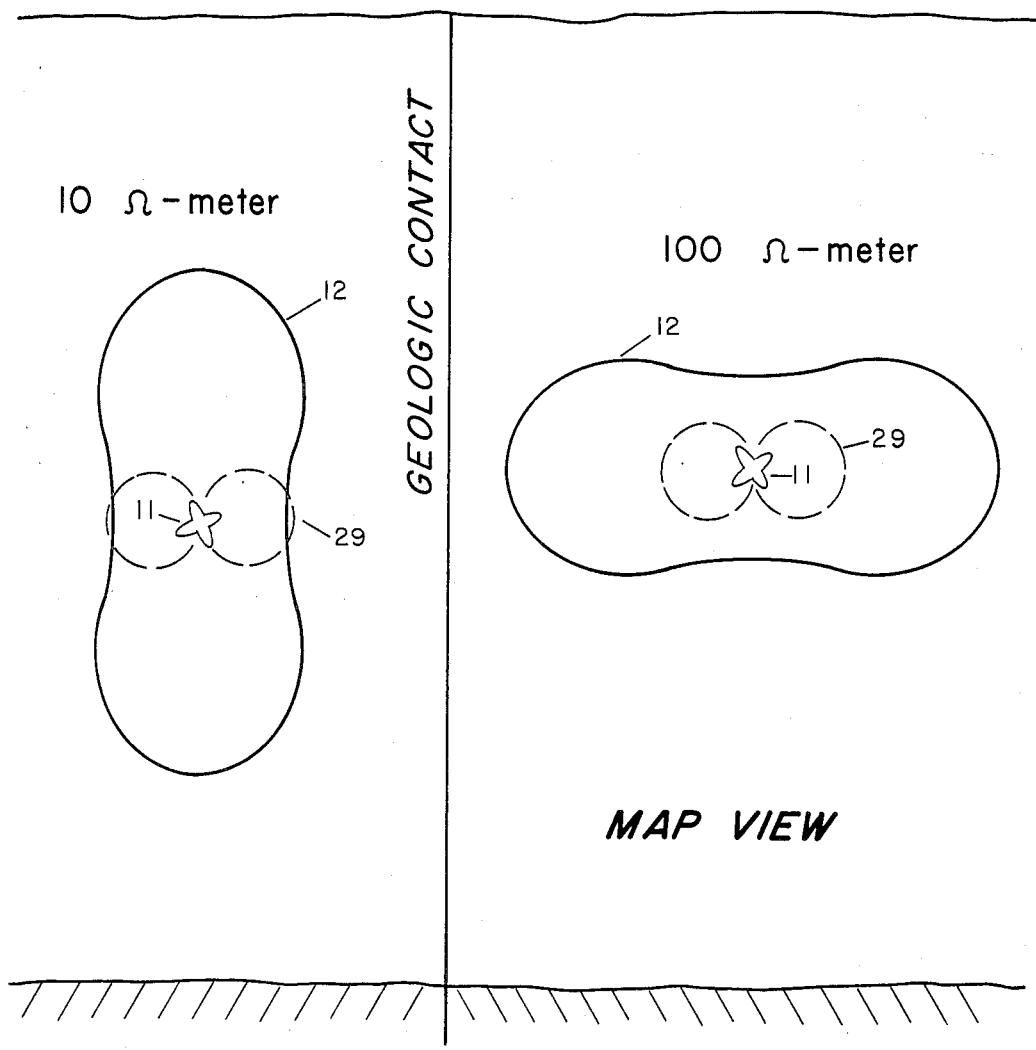
FIG. 8 shows a preferred method of combining so-called tipper and normalized impedance polar diagrams.

FIG. 8 shows a combined normalized impedance polar diagram and tipper polar diagram in which 29 indicates the tipper polar diagram given by equation (18) in which the magnitude of $X_{z'x'}(\alpha)$ has been normalized through division by the constant $2X_{z'x'}(\alpha)_{max}$. Figures of this sort are of particular usefulness when a determination of the relative conductivity of the subsurface below the measurement site is required or when the geologic strike direction must be determined from a single station measurement. As can be seen in FIG. 8, the long axis of the tipper polar diagram is always perpendicular to geologic contacts between regions of differing resistivity.

Figure 9:
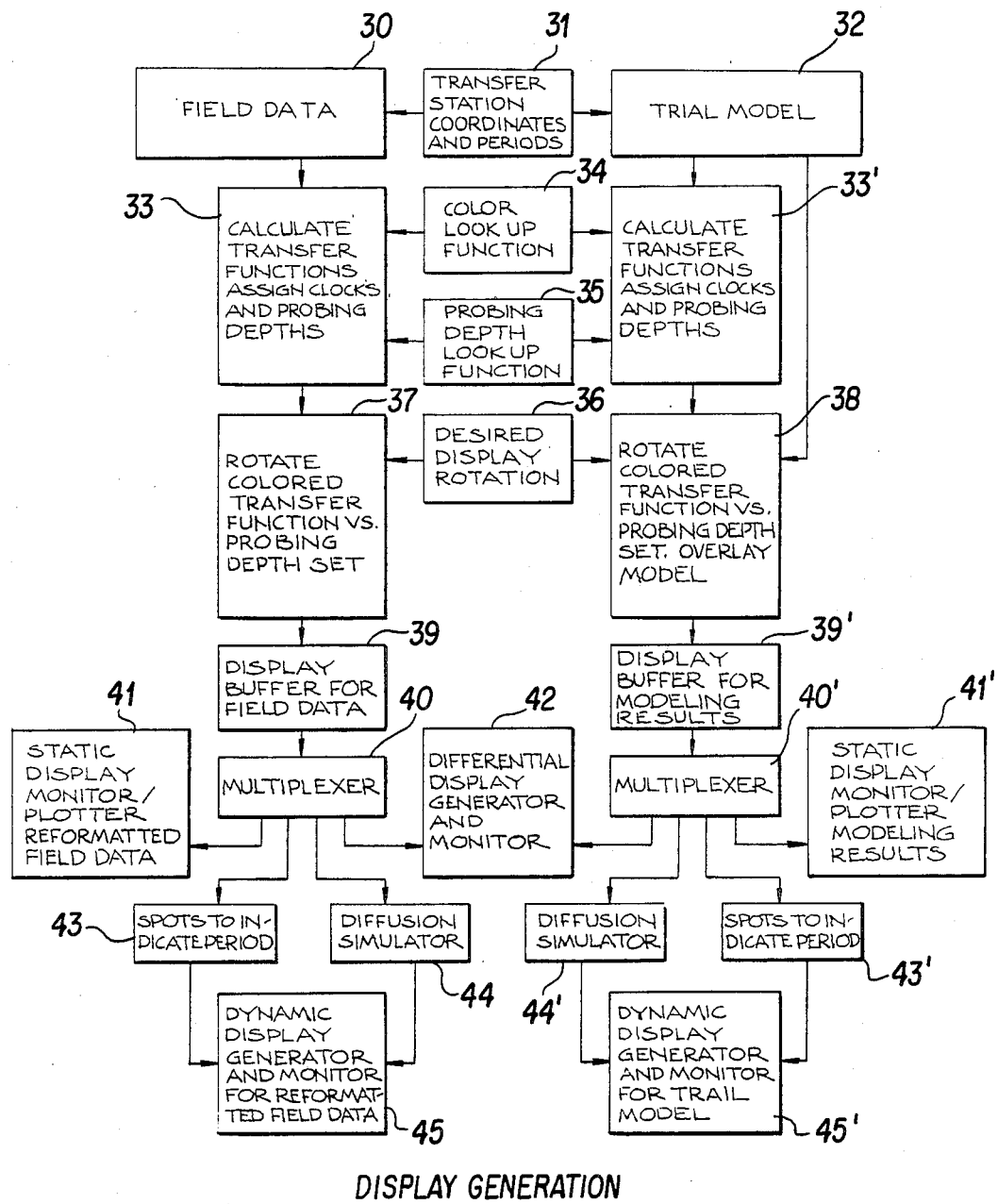
FIG. 9 is a flow diagram illustrating the method of generating and displaying the results of magnetotelluric analysis to produce static and dynamic displays.

The functioning of applicants invention can be summarized with reference to FIG. 9 which shows a flow diagram illustrating the method of generating and displaying the results of interpretation magnetotelluric to produce static and dynamic displays, representative of geologic structure and rock properties.

As will be noted, the reformatting of the field data and the generation of an equivalent set of model-derived data are carried out through the execution of a series of parallel but independent steps. From the field data, 30, the measurement stations' data measurement coordinates and locations are extracted along with the specific periods at which measurements were taken at the various field stations. This step is indicated by 31 in FIG. 9. These field data are required for full specification of the trial model in the step indicated by 32 on FIG. 9. The specification must include the selection of points on the surface of the model that are spatially disposed in a manner identical to the distribution of the actual field stations and the selections of periods for data valuation that are identical to those actually evaluated at the various stations used in the field survey.

In the step indicated by 33 and 33' in FIG. 9, transfer functions and their corresponding normalized impedance polar diagrams are determined. These normalized impedance polar diagrams (collectively referred to as transfer functions) are colored in accordance with the diagnostic colors provided from the selected color look up function, the step indicated by 34 in FIG. 9, and are assigned their probing depth through the use of the selected probing depth look up function a step indicated as step 35 in FIG. 9. A desired vantage point for viewing the resultant displays is selected in the step indicated by 36 in FIG. 9. The data describing the rotated, colored impedance polar diagrams (collectively referred to as transfer function) with their respective probing depths, which are available at the step indicated by 37 and 38 in FIG. 9, are loaded into a buffer from which they will be recalled to create the desired displays. The model used to create the model-derived impedance polar diagrams is also stored as indicated by the step designated by 38 in FIG. 9.

The two display buffers indicated by 39 and 39' in FIG. 9, into which the above described data are loaded are separate and allow the creation with the aid of multiplexers indicated in FIG. 9 by 40 and 40', all of the displays.

The static displays, the step (indicated by 41 and 41' in FIG. 9) simply display the properly rotated colored transfer functions in the form of their corresponding normalized impedance polar diagrams displayed at their appropriate probing depths. Display 41' can contain in addition to the above, lines representing the trial model geometry properly rotated and superimposed on the normalized impedance polar diagram display.

The dynamic displays are obtained by pulling data from the buffers in a controlled manner. The spot generation step indicated by 43 and 43' in FIG. 9 involves recalling for each period, transfer function values as a function of angular rotation, α, 4 in FIG. 1, and time. The diffusion simulation step indicated by 44 and 44' in FIG. 9 requires that data blocks representing entire transfer functions or normalized impedance polar diagrams be recalled as a function of time and in accordance with a selected diffusion relation. These dynamic displays are monitored on display monitors indicated by step 45 and 45' in FIG. 9.

With respect to operation of the so-called "work-station" that results from proper practice of the art disclosed herein, the field data set is of course fixed. It can, however, be viewed from various vantage points and the form of the normalized impedance polar diagram set studied. Once the operator has decided answers to such questions as the probable direction of the geologic strike and the dimensionality of the subsurface structure that seems to be suggested by the form of the field data normalized impedance polar diagram set, the stage is set for obtaining the theoretical response from a trial model and comparing these theoretical results against the measured field survey results. Normally displays indicated as steps 45, 45' and 42 in FIG. 9 provide the most insight on how to modify the model to bring its output into accord with the field survey data. The "best" model is the simplest model that will produce a "null" display on the differential display monitor, described as step 42 in FIG. 9.

Figure 10A:
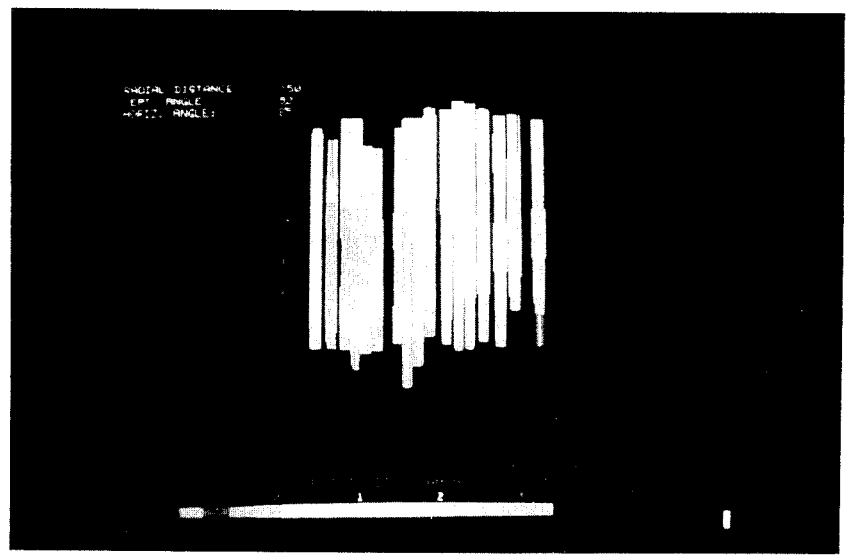
FIGS. 10a, 10b, show actual modeling results and geology deduced from field data obtained through the use of the method described herein.
Figure 10B:
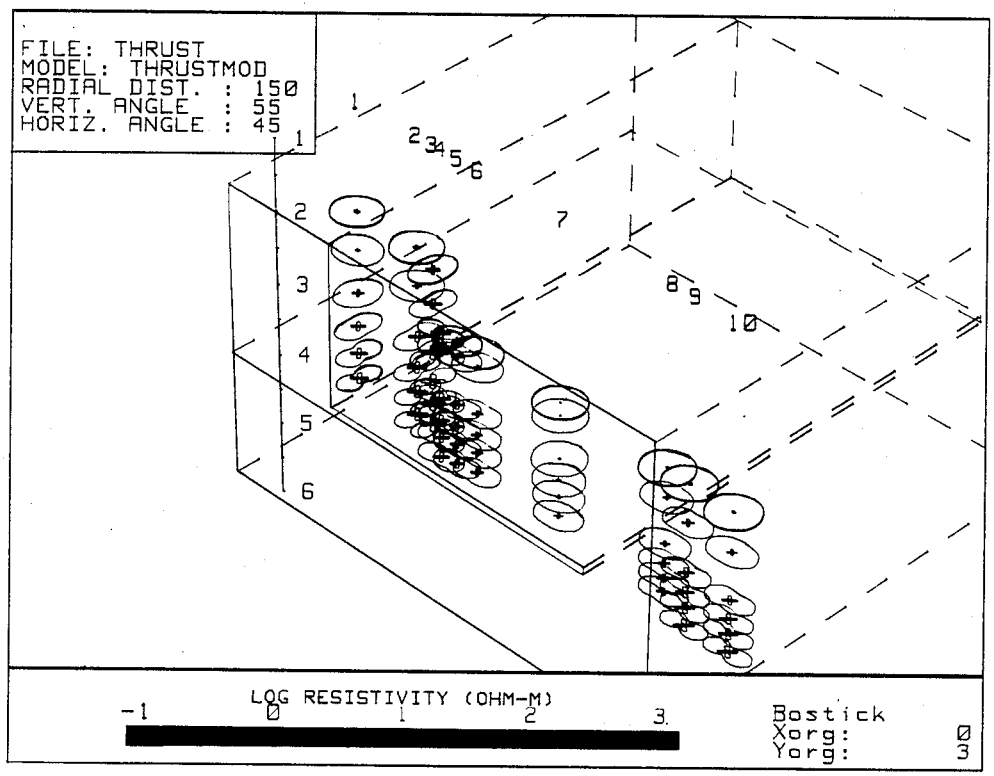

An example of static displays generated by the method herein disclosed is shown in FIG. 10. In this example the modeling is an attempt to understand the complicated geologic over-thrusting suggested by the field survey data. Although a total of fifteen colors were used to create the display, only three general ranges are indicated in FIG. 10; red, 49, (high resistivity crystalline rock), yellow, 50, (intermediate resistivity sedimentary rock) and green, 51, (low resistivity porous sediments).

While certain preferred embodiments of the invention have been specifically disclosed, it is understood that the invention is not limited thereto, as many variations will be readily apparent to those skilled in the magnetotelluric prospecting art, and the invention is to be given its broadest possible interpretation within the terms of the following claims.

I claim:

1. A method or process for visual display and analysis of subsurface geologic structure and rock properties utilizing for a common sequence of magnetotelluric wave periods, sequences of the standard impedance polar diagram input parameters Zxy, Zyy, Zxx, Zyx, where Zxy is a complex number that describes the amplitude and phase relations that exist between the electric field in the x direction and the magnetic field in the orthogonal y direction, and where Zxy is a complex number that describes the amplitude and phase relations that exist between the electric field in the y direction and the magnetic field in the y direction, and where Zxx is a complex number that describes the amplitude and phase relations that exist between the electric field in the x direction and the magnetic field in the x direction, and where Zyx is a complex number that describes the amplitude and phase relations that exist between the electric field in the y direction and the magnetic field in the orthogonal x direction, said sequences of the standard impdeance polar diagram input parameters being measured at known survey locations with known data measurement coordinates and said sequences of the standard impedance polar diagram input parameters also being calculated from numerical analysis of a model of the survey area comprising the steps of:

(a) displaying in three dimensional perspective properly oriented field survey impedance polar diagrams and model-derived impedance polar diagrams as a function of probing depth, (b) determining for each wave period for which field survey and model derived values are available a vector difference polar diagram equal to a vector difference between a field survey impedance polar diagram and the corresponding model-derived impedance polar diagram, and displaying said vector difference polar diagram at a probing depth derived from the corresponding field survey measurements, (c) displaying the model of the survey area used to obtain the model-derived polar diagrams in the same perspective as the model-derived polar diagrams, (d) rotating an apparent viewing volume along with the field-survey, the model-derived and the vector difference polar diagrams displayed therein, so as to allow a viewing of said field-survey, model-derived and vector difference polar diagrams in a different perspective, (e) segmenting the trace of every polar diagram at equal increments of rotation angle, (f) for each known survey location, assigning to each segment of each displayed field survey polar diagram a unique rock property related color that is derived from the measured polar diagram input parameters obtained at said known survey location, and period of a magnetotelluric wave being analyzed, (g) for each model location, assigning to each segment of each displayed model derived polar diagram a unique model property related color that is derived from said being calculated standard impedance polar diagram input parameters, for a model location, and from the period of said magnetotelluric wave used to calculate said calculated polar diagram input parameters, (h) for each model location, assigning to each segment of each displayed vector difference polar diagram a color that is determined by the magnitude and sign of the vector difference between a field survey polar diagram and the corresponding model-derived polar diagram, (i) creating a dynamic display containing said field survey polar diagrams, said model derived polar diagrams and vector difference polar diagrams, in which each polar diagram trace contains a spot of enhanced trace intensity that moves along said each polar diagram's trace in such a way as to complete its circuit around said each trace in a time period that is proportional to the period of the magnetotelluric wave whose transfer function gives rise to said each trace, and in which the position of said spot of enhanced intensity can be adjusted, (j) adjusting the position of said spot of enhanced trace intensity on each polar diagram for a given wave period, such that all spots for a given wave period reach the maximum amplitude location on their respective polar diagram at the same instant of time, (k) illuminated sequentially said field survey polar diagrams, said model derived polar diagrams and said vector difference polar diagrams, this illumination proceeding from polar diagrams of transfer functions of short period magnetotelluric waves, to those of long period magnetotelluric waves.

2. A method according to claim 1 wherein the step of displaying in three dimensional perspective comprises determining a probing depth function, D, given by $$D = 0.1 \, (T|Zx'y'(\alpha)|max + T|Zx'y'(\alpha)|min)$$

where T is the period of the waves being analyzed and $|Zx'y'(\alpha)|max$ and $|Zx'y'(\alpha)|min$ are magnitudes of axes of an anti-diagonal impedance polar diagram, said anti-diagonal impedance polar diagram being given by $Zx'y'(\alpha) = ZxyCos^2(\alpha) + (Zyy - Zxx)Sin(\alpha)Cos(\alpha) - ZyxSin^2(\alpha)$ in which Zxy, Zyy, Zxx, Zyx, are said standard impedance polar diagram input parameters and where $\alpha$ is an arbitrary angle in the horizontal x, y, plane measured in a positive clockwise direction from the x coordinate axis.

3. A method according to claim 1 wherein the step of displaying in three dimensional perspective further comprises displaying a normalized anti-diagonal impedance polar diagram given by $$\frac{Zx'y'(\alpha)}{Zx'y'(\alpha)max} =$$

$$ZxyCos^2(\alpha) + (Zyy - Zxx)Sin(\alpha)Cos(\alpha) - ZyxSin^2(\alpha)$$

in which Zxy, Zyy, Zxx, Zyx, are the standard impedance polar diagram input parameters and where $\alpha$ is an arbitrary angle in the horizontal x,y, plane measured in a positive clockwise direction from the x coordinate axis, and in which $Zx'y'(\alpha)max$ is a constant that scales said normalized anti-diagonal impedance polar diagram to unit maximum amplitude.

4. A method according to claim 1 wherein the step of displayinq in three dimensional perspective further comprises displaying a normalized diagonal impedance polar diagram given by $$\frac{Zx'x'(\alpha)}{Zx'y'(\alpha)max} =$$

$$ZxxCos^2(\alpha) + (-Zxy - Zxx)Sin(\alpha)Cos(\alpha) + ZyySin^2(\alpha)$$

in which Zxy, Zyy, Zxx, Zyx, are the standard impedance polar diagram input parameters and where $\alpha$ is an arbitrary angle in the horizontal x,y, plane measured in a positive clockwise direction from the x coordinate axis and in which $Zx'y'(\alpha)max$ is a constant corresponding to the maximum value of $Zx'y'(\alpha) = ZxyCos^2(\alpha) + (Zyy - Zxx)Sin(\alpha)Cos(\alpha) - ZyxSin^2(\alpha)$.

5. A method according to claim 1 wherein the step of displaying in three dimensional perspective comprises determining a probing depth function, D, given by $D = 0.2T|Zx'y'(\alpha)|te$ where T is the period being analyzed and $|Zx'y'(\alpha)|te$ is the magnitude of an anti-diagonal impedance $Zx'y'(\alpha)$ as given by $$Zx'y'(\alpha) = ZxyCos^2(\alpha) + (Zyy - Zxx)Sin(\alpha)Cos(\alpha) - ZyxSin^2(\alpha)$$

in which a direction x' is in the geologic strike direction, and in which Zxy, Zyy, Zxx, Zyx, are the standard impedance polar diagram input parameters and where $\alpha$ is an arbitrary angle in the horizontal x,y, plane measured in a positive clockwise direction from the x coordinate axis.

6. A method according to claim 1 wherein the step of assigning the unique color comprises determining for each segment a magnitude of resistivity, $\rho_a x'y'(\alpha)$, given by $$\rho_a x'y'(\alpha) = \cdot 2T|Z \, x'y'(\alpha)|^2$$

in which T is the period of the wave being analyzed and $Zx'y'(\alpha)$ is given by $$Zx'y'(\alpha) = ZxyCos^2(\alpha) + (Zyy - Zxx)Sin(\alpha)Cos(\alpha) - ZyxSin^2(\alpha)$$

in which Zxy, Zyy, Zxx, Zyx, are the standard impedance polar diagram input parameters and where ? is an arbitrary angle in the horizontal x,y, plane measured in a positive clockwise direction from the x coordinate axis, and assigning to said each segment a predetermined color according to said resistivity magnitude.

7. A method according to claim 1 wherein the step of assigning the unique color comprises determining for each segment the magnitude of resistivity, $\rho_B x'y'(\alpha)$, given by $$\rho_B x'y'(\alpha) = \rho_a x'y'(\alpha) \frac{\pi/2 - \phi x'y'(\alpha)}{\phi x'y'(\alpha)}$$

in which $\phi_{x'y'}(\alpha)$ is a phase angle corresponding to impedance element $Z_{x'y'}(\alpha)$ given by $$Z_{x'y'}(\alpha) = ZxyCos^2(\alpha) + (Zyy - Zxx)Sin(\alpha)Cos(\alpha) - ZyxSin^2(\alpha)$$

and in which Zxy, Zyy, Zxx, Zyx, are the standard impedance polar diagram input parameters and where ? is an arbitrary angle in the horizontal x,y, plane measured in a positive clockwise direction from the x coordinate axis, and in which $$\rho_a x 40\ y'(\alpha) = .2T |Zx'y'(\alpha)|^2$$

in which T is the period of the wave being analyzed, and assigning to said each segment a predetermined color according to said magnitude of $\rho_B x'y'(\alpha)$.

8. A method as set forth in claim 7 in which symmetry of the colored segment distribution, with respect to the axes of each polar diagram on which said colored segment distribution is displayed is used as a test for internal consistency between magnetotelluric phase and amplitude information.

9. A method as set forth in claim 1 in which the sequential illumination of step (k) proceeds in accordance with a diffusion relation $$t_{rt} = (9/8)2T/2 = 0.633T,$$

in which $t_{rt}$ is a "real-time" illumination time corresponding to the actual diffusion process taking place, and T is the period of the magnetotelluric waves being analyzed.

10. A method as set forth in claim 1 further comprising accelerating the sequential illumination of step (k) by means of logarithmic time base compression given relation $$t_i = n\ \log t_{rt}$$

in which $t_i$ is an illumination time, n is a positive constant and $t_{rt}$ is a "real-time" illumination time given by $$t_{rt} = (9/8)^2 T/2 = 0.633T,$$

corresponding to the actual diffusion process taking place, and T is the period of the magnetotelluric waves being analyzed.

11. A method in accordance with claim 1 in which for each vertical array of field survey, model-derived and vector difference polar diagrams, a vertical width of each polar diagram trace displayed in step (a), is increased vertically upward so that said each trace just merges with a next overlying polar diagram trace, said increase not being applied to the polar diagram trace displayed at smallest probing depth.

12. A method as set forth in claim 1 further comprising a step of highlighting a range of rock property by highlighting a corresponding range of color through replacement of said range of color by a default color or by having said default color appear for all color values falling outside the range to be highlighted.

13. A method in accordance with claim 1 in which the color selected in step (f) or (g) to color a segment of an anti-diagonal impedance polar diagram perimeter, is also used to color the enclosed area or sector formed by the radii that delimit the extremities of the segment, and said segment.

14. The method of claim 1 further comprising a step of displaying in three dimensional perspective properly oriented polar diagrams as a function of probing depth directly on a cathode ray tube viewing screen and producing a hard copy of said viewing screen using a combination of Polarcrome dry process color transparancies and color xerography.

15. The method of claim 1 further comprising a step of directing a three-dimensional image to a color ink-jet printer or to a color electrostatic printer.

16. A method as set forth in claim 1 further comprising a step of displaying along with said field-survey and model derived polar diagrams displayed in step (a), values of resistivity, $\rho_T$, derived from borehole electrical measurements, using an identical perspective and scale as used for displaying said field-survey and model derived polar diagrams.

17. A method as set forth in claim 15 in which an identical color call-up code is used to color both said field survey and model-derived polar diagrams and resistivity value derived from borehole electrical measurements.

18. A method as set forth in claim 1 in which step (a) comprises recalling for display from a buffer values of $$Zx'x'(\alpha)_{mdl} - Zx'x'(\alpha)_{fld},$$

a difference between a model derived diagonal impedance and a corresponding diagonal impedance as measured at a field location;

$$Zx'y'(\alpha)_{mdl} - Zx'y'(\alpha)_{fld},$$

a difference between a model derived anti-diagonal impedance and a corresponding anti-diagonal impedance as measured at a field location;

$$Zx'x'(\alpha)/Zx'y'(\alpha)_{max},$$

a ratio of a diagonal impedance and the maximum value of a corresponding anti-diagonal impedance; and $$Zx'y'(\alpha)/Zx'y'(\alpha)_{max'}$$

a ratio of an anti-diagonal impedance and the maximum value of said anti-diagonal impedance; all as functions of a probing depth and rotation angle $\alpha$.

19. A method as set forth in claim 1 in which step (g) comprises recalling as a function of rotation angle and time for display from a buffer values forming a segment over a small and fixed increment of rotation angle of functions $$Zx'x'(\alpha)_{mdl} - Zx'x'(\alpha)_{fld},$$

a difference between a model derived diagonal impedance and a corresponding diagonal impedance measured at a field location;

$$Zx'y'(\alpha)_{mdl} - Zx'y'(\alpha)_{fld},$$

a difference between a model derived anti-diagonal impedance and a corresponding anti-diagonal impedance measured at a field location;

$$Zx'x'(\alpha)/Zx'y'(\alpha)_{max},$$

a ratio of the diagonal impedance and the maximum value of a corresponding anti-diagonal impedance; and $$Zx'y'(\alpha)/Zx'y'(\alpha)_{max},$$

a ratio of an anti-diagonal impedance and a maximum value of said anti-diagonal impedance; and displaying a color assigned in step (f) of claim 1 to send segment at at increased intensity.

20. The method of claim 1 in which radically differing color look-up tables are used for positive and negative values of each vector difference polar diagram determined in step (b) and given by $$Zx'x'(\alpha)_{mdl} - Zx'x'(\alpha)_{fld},$$

a difference between a model derived diagonal impedance and a corresponding diagonal impedance measured measured at a field location; and $$zx'y'(\alpha)_{mdl} - Zx'y'(\alpha)_{fld},$$

a difference between a model derived anti-diagonal impedance and a corresponding anti-diagonal impedance measured at a field location.

21. The method of claim 1 in which two images of a same display having slightly differing vantage points are generated and viewed stereoscopically.

22. The method of claim 1 in which each nomalized impedance polar diagram contains within it, in the same horizontal plane, a normalized tipper polar diagram give by $$\frac{Xz'x'(\alpha)}{2Xz'x'(\alpha)max} = Xzx \cos(\alpha) + Xzy \sin(\alpha),$$

in which $Xzx$ and $Xzy$ are magnetic transfer functions that relate horizontal magnetic field components $Hx$ and $Hy$ to a vertical magnetic component $Hz$ in accordance with an equation $Hz = XzzHx + XxyHy$, said values of $Hx$ and $Hy$ having been measured in order to calculate said impedance polar diagram input parameters $Zxy$, $Zyy$, $Zxx$, $Zyx$, and in which $2Xz'x'(\alpha)max$ is a constant equal to twice the maximum value of $Xzx \cos(\alpha) + Xzy \sin(\alpha)$, and further in which $\alpha$ is an arbitrary angle in the horizontal x,y, plane measured in a positive clockwise direction from the x coordinate axis.

* * * * *